United States Patent [19]
Maruyama et al.

[11] Patent Number: 5,354,179
[45] Date of Patent: * Oct. 11, 1994

[54] FLUID ROTATING APPARATUS
[75] Inventors: Teruo Maruyama, Hirakata; Tatsuhisa Taguchi, Katano; Yoshikazu Abe; Mikio Hasegawa, both of Neyagawa, all of Japan
[73] Assignee: Matsushita Electric Industrial Co., Ltd., Osaka, Japan
[*] Notice: The portion of the term of this patent subsequent to Mar. 30, 2010 has been disclaimed.
[21] Appl. No.: 988,694
[22] Filed: Dec. 10, 1992

Related U.S. Application Data

[63] Continuation-in-part of Ser. No. 738,902, Aug. 1, 1991, Pat. No. 5,197,861.

[30] Foreign Application Priority Data

Aug. 1, 1990 [JP] Japan .................................. 2-204912
Sep. 25, 1990 [JP] Japan .................................. 2-255798
Nov. 28, 1990 [JP] Japan .................................. 2-332358

[51] Int. Cl.$^5$ ...................... F04C 23/00; F04D 19/04
[52] U.S. Cl. ......................................... 417/42; 417/45; 417/203; 417/205; 417/250; 417/410.3; 418/201.1
[58] Field of Search ............... 417/42, 45, 201, 205, 417/410 B, 423.4, 203, 250; 418/201.1

[56] References Cited

U.S. PATENT DOCUMENTS

| Re. 17,689 | 6/1930 | Hibbard . |
| 2,243,874 | 6/1941 | Lysholm . |
| 2,640,428 | 6/1953 | Houghton ........................ 417/410 |
| 3,639,087 | 2/1972 | Frohbieter . |
| 3,811,805 | 5/1974 | Moody, Jr. et al. . |
| 4,152,092 | 5/1979 | Swearingen . |
| 4,420,291 | 12/1983 | Winstead . |
| 4,625,156 | 11/1986 | Komiya et al. . |
| 4,712,048 | 12/1987 | Rebsamen . |
| 4,758,132 | 7/1988 | Hartwig . |
| 4,797,068 | 1/1989 | Hayakawa et al. ................ 417/201 |
| 4,808,077 | 2/1989 | Kan et al. . |
| 4,829,217 | 5/1989 | Kameyama et al. . |
| 4,850,806 | 7/1989 | Morgan et al. . |
| 5,062,771 | 11/1991 | Satou et al. . |
| 5,115,172 | 5/1992 | Ishii et al. . |
| 5,118,251 | 6/1992 | Saulgeot ........................ 417/423.4 |
| 5,166,566 | 11/1992 | Bernhardt et al. . |
| 5,197,861 | 3/1993 | Maruyama et al. ............... 417/423.4 |

FOREIGN PATENT DOCUMENTS

| 0221003 | 5/1987 | European Pat. Off. . |
| 0256234 | 6/1987 | European Pat. Off. . |
| 0230868 | 8/1987 | European Pat. Off. . |
| 0340658 | 4/1989 | European Pat. Off. . |
| 0382029 | 8/1990 | European Pat. Off. . |
| 0435291 | 12/1990 | European Pat. Off. . |
| 2163474 | 6/1973 | Fed. Rep. of Germany . |
| 3230550 | 1/1984 | Fed. Rep. of Germany . |
| 0259791 | 12/1985 | Japan . |
| 62-314056 | 6/1989 | Japan . |
| 809445 | 2/1959 | United Kingdom . |
| 2123089A | 1/1984 | United Kingdom . |

OTHER PUBLICATIONS

"A Generalized Performance Computer Program for Oil Flooded Twin-Screw Compressor", Pawan J. Singh and Ghanshyam C. Patel, Ingersoll-Rand Research, Inc. Princeton, N.J. 1984, pp. 544–553.
"Computer Modeling for Performance Analysis of Rotary Screw Compressor", Mitsuru Mitsuru Fujiwara and Katsuhiko Kasuya, Mechanical Engineering Research Laboratory, Hitachi, Ltd., Ibaraki, Japan, 1984, pp. 536–543.
"A New Molecular Pump", Louise Maurice, Proc. 6th Internl, Vacuum Congr. 1974 Japan, J. Appl. Phys. Suppl. 2, Pt. 1, 1984.
Patent Abstracts of Japan "Multichanccel Type Vacuum Pump", vol. 13, No. 225 (M-830) [357], May 25, 1989.

Primary Examiner—Richard A. Bertsch
Assistant Examiner—Roland G. McAndrews, Jr.
Attorney, Agent, or Firm—Wenderoth, Lind & Ponack

[57] ABSTRACT

A fluid rotating apparatus according to the present invention is designed to promptly achieve an extremely high degree of vacuum from atmospheric pressure by its single apparatus. Moreover, high-speed synchronous rotation of the rotary shafts of the apparatus is controlled by use of a rotary position detecting sensor, to thereby avoid control through mechanical contact thereof with a gear or the like. In addition, hydrostatic bearings are employed for supporting the rotary shaft to avoid mechanical abrasion and the use of lubricant oil.

10 Claims, 13 Drawing Sheets

FLUID ROTATING APPARATUS

This application is a continuation-in-part application of application Ser. No. 07/738,902 filed Aug. 1, 1991, now U.S. Pat. No. 5,197,861.

BACKGROUND OF THE INVENTION

The present invention relates to a fluid rotating apparatus such as a vacuum pump or a compressor.

Figure 14:
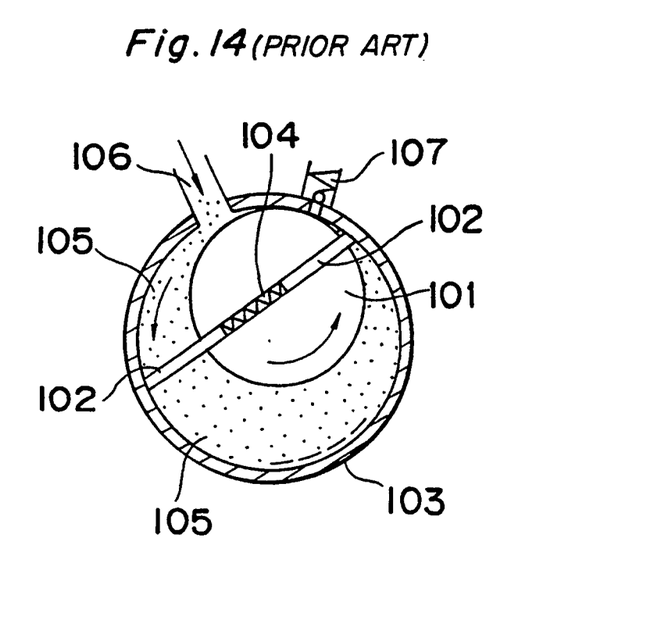
FIG. 14 is a transverse cross sectional view showing a first conventional vacuum pump.

FIG. 14 shows a conventional vacuum pump provided with only one rotor. In the single rotor type vacuum pump, upon rotation of a rotor 101, two blades 102 and 102 inserted into the rotor 101 in the diameter direction of the rotor 101 rotate within a fixed cylindrical wall (stator), with the leading ends thereof in contact with the fixed wall because the two blades are urged in the diameter direction of the rotor by the operation of a spring 104. As a result, the capacity of each of two spaces 105, 105, partitioned by the two blades, within the fixed wall changes. Consequently, suction and compression of the fluid occurs, and fluid which has flowed in through a suction port 106 provided in the fixed wall flows out through a discharge port 107 provided with a discharge valve. In the vacuum pump, in order to prevent internal leakage, it is necessary to seal the side surfaces and the leading ends of the blades 102, the side surfaces of the fixed wall 103, and the side surfaces of the rotor 101 with an oil film, respectively. Consequently, when this vacuum pump is used in a semiconductor manufacturing process such as CVD or dry etching in which a very corrosive reactive gas such as chlorine gas is used, the gas reacts with the sealing oil to form a reaction product in the pump. In such cases, it is necessary to perform maintenance operations frequently to remove the reaction product. In each maintenance operation, it is necessary to clean the pump to eliminate the reaction product and replace the oil. To do this, it is necessary to stop the operation of the process, and hence the operation rate is reduced. So long as the sealing oil is used in the vacuum pump, oil diffuses from the downstream side to the upstream side, thus polluting the vacuum chamber and deteriorating the performance of the process.

Figure 15:
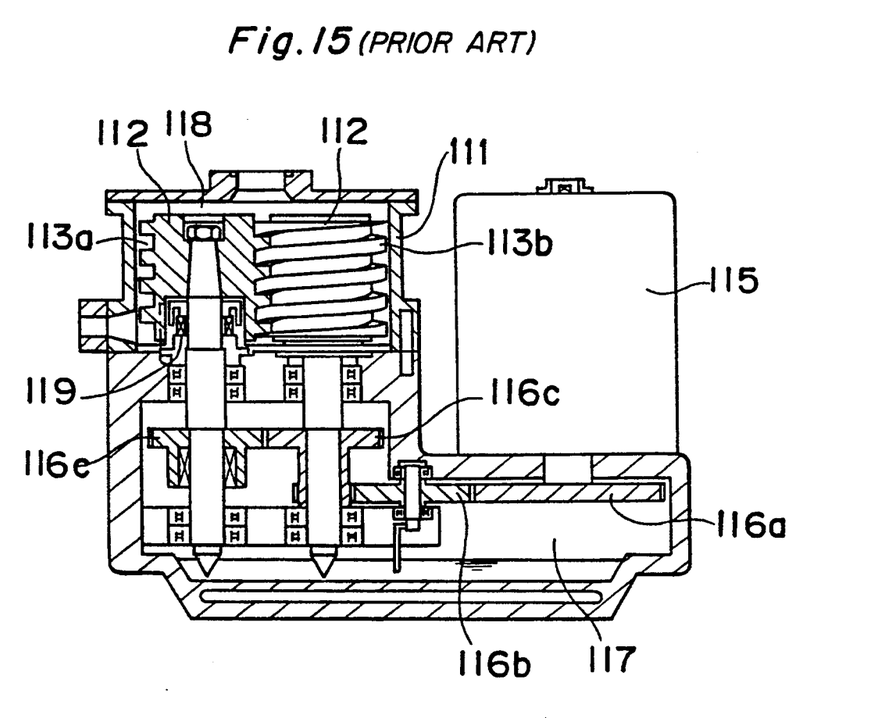
FIG. 15 is longitudinal sectional view showing a second conventional vacuum pump.

In view of these issues, for example, a screw type vacuum pump has been developed and put into practical use as a dry pump which eliminates the use of sealing oil. FIG. 15 shows an example of a screw type vacuum pump. Two rotors 112 and 112, the rotational shafts of which are parallel with each other, are provided in a housing 111, and spiral grooves are formed on the peripheral surfaces of the rotors 112 and 112 between which a space is formed by engaging a concave portion (groove) 113a of one rotor with a projection 113b of the other rotor. Upon rotation of both rotors 112 and 112, the capacity of the space changes, and thus a suction/-discharge operation is performed.

In the conventional two-rotor type vacuum pump, the two rotors 112 and 112 are synchronously rotated by a timing gear. That is, the rotation of a motor 115 is transmitted from a driving gear 116a to an intermediate gear 116b and then, to one of timing gears 116c and 116c in mesh provided on the shaft of each rotor 112. The phase of the rotational angles of both rotors 112 and 112 are adjusted by the engagement between the two timing gears 116c and 116c. Since gears are used for the power transmission of the motor and the synchronous rotation of the rotors in this type of vacuum pump, the vacuum pump is constructed to supply lubricating oil provided in a machine operation chamber 117 accommodating the above-described gears to the above-described gears. In addition, a mechanical seal 119 is provided between a fluid operating chamber 118 and the machine operation chamber 117 so that the lubricating oil does not penetrate into the fluid operating chamber 118 accommodating the rotors.

The two-rotor type vacuum pump of the above-described construction is beset with the following problems: (1) it is necessary to periodically replace the seals due to abrasion of the mechanical seal, and thus the pump is not maintenance-free; (2) mechanical loss is great because sliding torque is great due to the mechanical seal; (3) many gears are required for the power transmission and the synchronous rotation, i.e. many parts are required, so that the apparatus has a complicated construction; (4) synchronous rotation is obtained by use of contact type gears, so that high speed rotation is impossible and the apparatus is large-sized.

SUMMARY OF THE INVENTION

In view of the above-described situation, it is an object of the present invention to provide a fluid rotating apparatus which enables high speed rotation of a rotor, eliminates the need for maintenance, and can be easily cleaned and miniaturized.

In accomplishing these and other objects, according to one aspect of the present invention, there is provided a fluid rotating apparatus comprising:

a plurality of rotors accommodated in a housing;

a bearing supporting rotation of the rotors;

a fluid suction port and a fluid discharge port formed in the housing;

a motor for individually driving each of the rotors; and detecting means for detecting rotational angles and numbers of rotations of the motors;

wherein in response to a signal outputted from the detecting means, fluid is sucked and discharged due to a capacity change of a space formed by the rotors and the housing.

According to another aspect of the present invention, there is provided a vacuum pump for broad-band use, comprising:

a housing having a first chamber and a second chamber communicating with the first chamber;

a first rotary shaft rotatably accommodated in the first chamber;

a second rotary shaft rotatably accommodated in the second chamber, the first and second rotary shafts being synchronously rotated;

positive displacement vacuum pump structure sections formed at outer peripheries of the first and second rotary shafts where the first chamber communicates with the second chamber;

a kinetic vacuum pump structure section formed at an outer periphery of the first rotary shaft spaced from the positive displacement vacuum pump structure section;

a first suction port formed at a part of the first chamber where the kinetic vacuum pump structure section of the first rotary shaft is formed; and a discharge port formed at a part of one of the first and second chambers where the positive displacement vacuum pump structure section is formed.

In the above arrangements, it is unnecessary to use gears to provide synchronous rotation of the rotors and the power transmission of the motors, because each rotor is driven by means of an independent motor and is controlled to rotate synchronously by means of a non-contact type rotary synchronizing means. As a result, oil lubrication to the gears is unnecessary and high speed operation of the apparatus can be obtained.

Fluid flow becomes continuous, the occurrence of internal leakage is reduced, and the internal space of the rotors can be increased, so that the internal space can be utilized as a space for accommodating bearings and motors by applying the present invention to a positive-displacement vacuum pump and using the screw type vacuum pump. As a result, the apparatus is compact in structure.

BRIEF DESCRIPTION OF THE DRAWINGS

These and other objects and features of the present invention will become apparent from the following description taken in conjunction with the preferred embodiments thereof with reference to the accompanying drawings, in which:

FIG. 9 through 13 are schematic descriptive views showing modifications of a rotary body to be used in the present invention;

DETAILED DESCRIPTION OF THE PREFERRED EMBODIMENTS

Before the description of the present invention proceeds, it is to be noted here that like parts are designated by like reference numerals throughout the accompanying drawings.

Figure 1A:
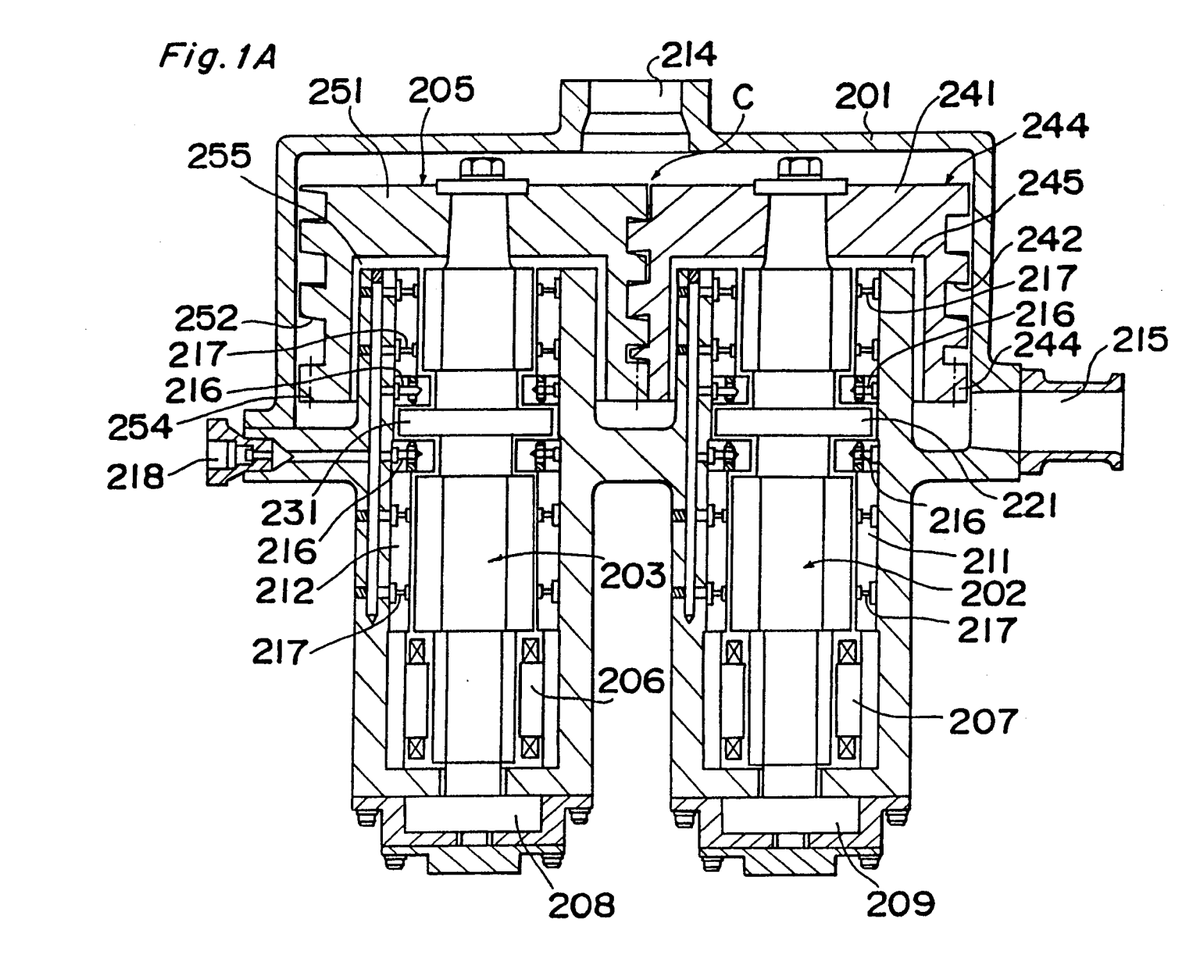
FIG. 1A is a sectional view showing a first embodiment of a positive displacement vacuum pump according to the present invention.
Figure 1B:
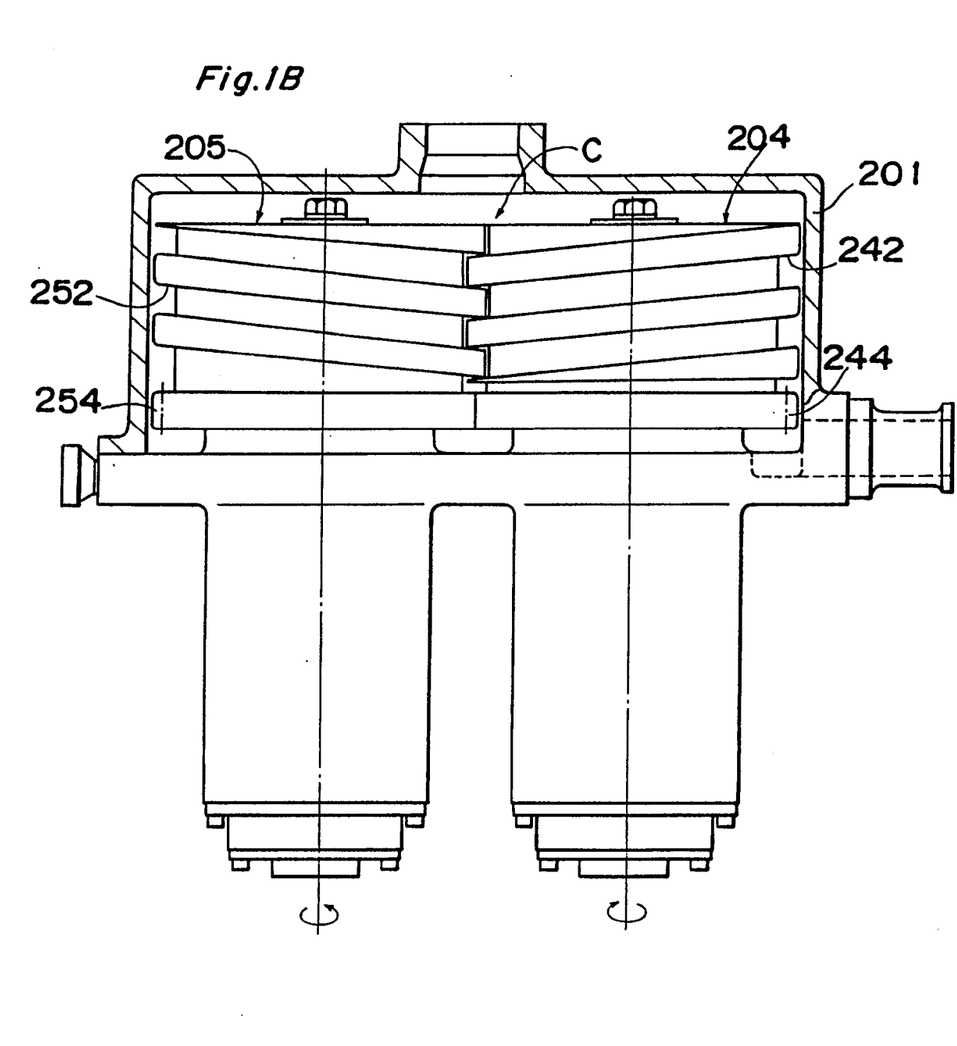
FIG. 1B is a side elevation partly in section showing a housing, according to the first embodiment.

FIG. 1 shows a positive displacement vacuum pump which is an embodiment of a fluid rotating apparatus according to the present invention. The vacuum pump has a first bearing chamber 211 accommodating a first rotary shaft 202 disposed vertically in a housing 201 and a second bearing chamber 212 accommodating a second rotary shaft 203 disposed vertically therein as shown in FIG. 1. Cylindrical rotors 204 and 205 are engaged with each other above both rotary shafts 202 and 203. First spiral grooves 242 and 252 are formed on the peripheral surfaces of the rotors 204 and 205 so that the first spiral grooves 242 and 252 engage with each other. The portion in which both first spiral grooves 242 and 252 engage with each other constitutes a positive displacement vacuum pump structure section A (referred to as first structure section A hereinafter). That is, a closed space is defined by the concave portions (grooves) and projection portions of the engagement portions of both of the first spiral grooves 242 and 252, and the housing 201. The space periodically changes its capacity upon rotation of the rotary shafts 202 and 203, and a suction/discharge operation is displayed due to its capacity change.

Figure 2:
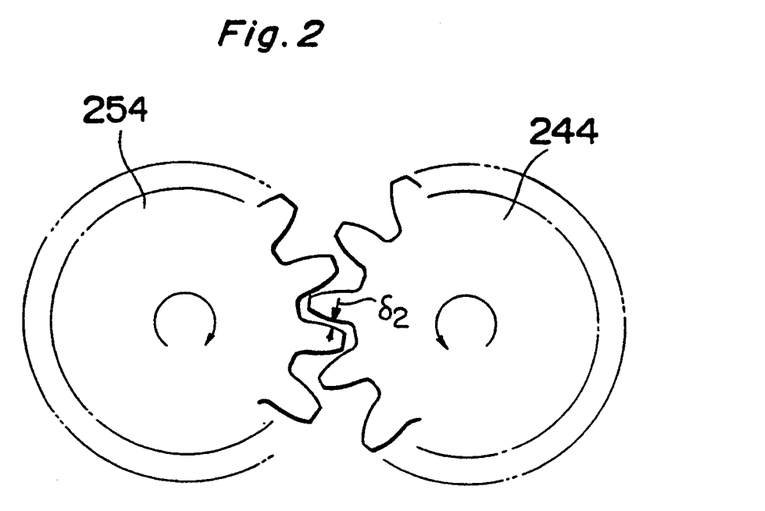
FIG. 2 is a plan view of a contact preventing gear to be used in the first embodiment.

Contact preventing gears 244 and 254, for preventing contact between the first spiral grooves 242 and 252 (i.e. between the rotors 204, 205), are provided on the lower ends of the peripheral surfaces of the rotors 204 and 205 as shown in FIG. 2. Solid lubricating films are formed on the contact preventing gears 244 and 254 so that they can withstand some metal contacts. A space (backlash gap) $\delta_2$ in the engagement portion between both contact preventing gears 244 and 254 is smaller than a space (backlash gap) $\delta_1$ in the engagement portion between the first spiral grooves formed on the peripheral surface of each of the rotors 204 and 205. Therefore, when the rotary shafts 202 and 203 are synchronously rotating smoothly, both contact preventing gears 244 and 254 do not contact with each other, but if the rotary shafts 202 and 203 are not synchronously rotating, the contact preventing gears 244 and 254 contact with each other before the first spiral grooves 242 and 252 contact with each other, thus preventing contact and collision between the first spiral grooves 242 and 252. If the backlashes $\delta_1$ and $\delta_2$ are slight, there is a concern that the processing accuracy of the members cannot be obtained in practical operation. But the total amount of fluid leakage during one stroke of the pump is proportional to the period of time required for the pump to make one stroke, so that when the rotary shafts 202 and 203 rotate at high speeds, even if the backlash $\delta_1$ between the first spiral grooves 242 and 252 is great, the performance (ultimate vacuum) of the vacuum pump can be sufficiently maintained. Accordingly, when the rotary shafts 202 and 203 rotate at high speeds, with a normal processing accuracy, the backlashes $\delta_1$ and $\delta_2$ having a size necessary for preventing the collision between the first spiral grooves 242 and 252 can be reliably obtained.

In the housing 201, a suction port 214 is provided in the upstream side of the first structure section A of the positive displacement vacuum pump and a discharge port 215 is provided in the downstream side thereof.

The first rotary shaft 202 and the second rotary shaft 203 are supported by non-contact type hydrostatic bearings, described below, provided in internal spaces 245 and 255 of the cylindrical rotors 204 and 205. That is, thrust bearings are constituted by supplying compressed gas from orifices 216 to the upper and lower surfaces of disk-shaped portions 221 and 231 formed on the rotary shafts 202 and 203, and radial bearings are constituted by supplying compressed gas from orifices 217 to the peripheral surfaces of the rotary shafts 202 and 203. The pressure inside the internal spaces 245 and 255 accommodating motors 206 and 207 can be made higher than the atmospheric pressure by using clean nitrogen reserved in a semiconductor factory as compressed gas. Therefore, a reactive gas which is corrosive and easily produces sediment can be prevented from penetrating into the internal spaces 245 and 255.

The bearing may be a magnetic bearing instead of a hydrostatic bearing, and since magnetic bearings are non-contact type bearings similar to hydrostatic bearings, high speed rotation can be easily accomplished and an oil-free construction can be obtained. When a ball bearing is used as the bearing and lubricating oil is used for the lubrication thereof, a gaps purge mechanism utilizing nitrogen gas is capable of preventing the penetration of fluid into the fluid operation chamber.

The first rotary shaft 202 and the second rotary shaft 203 are rotated at high speeds of several ten of thousands of revolutions per minute by the AC servomotors 206 and 207 provided in the lower portion thereof.

Figure 3:
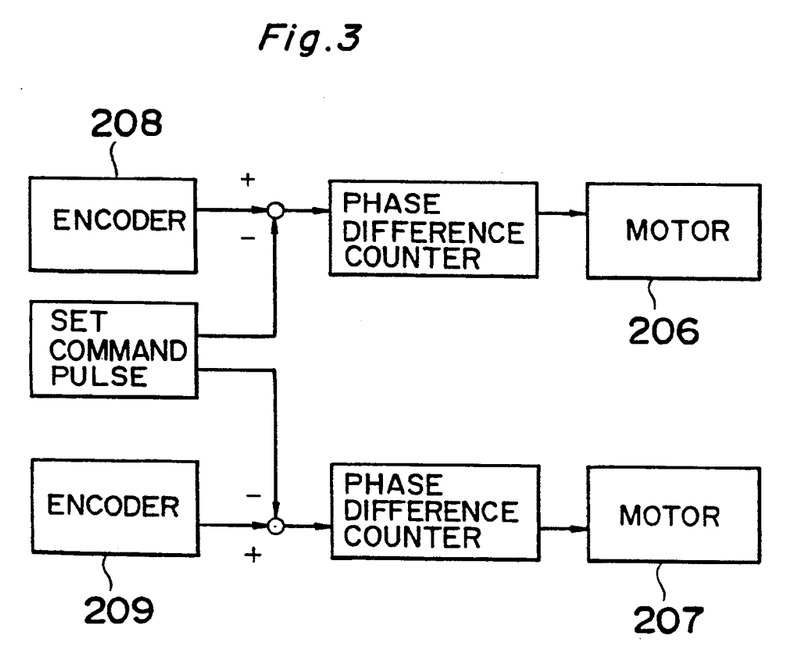
FIG. 3 is a block diagram showing the method of synchronous control.

The synchronous rotation of the two rotary shafts 202 and 203 in this embodiment is controlled by the method shown by the block diagram of FIG. 3. That is, as shown in FIG. 1, rotary encoders 208 and 209 are provided on the lower ends of the rotary shafts 202 and 203, and the output pulses of the rotary encoders 208 and 209 are compared with set command pulses (target value) set for an assumed rotor. The deviation between the target value and the output value (number of rotations and angle of rotation) from each of the shafts 202 and 203 is calculated by a phase difference counter, and the rotation of the servomotors 206 and 207 of each of the rotary shafts 202 and 203 is controlled to erase the deviation.

Figure 4:
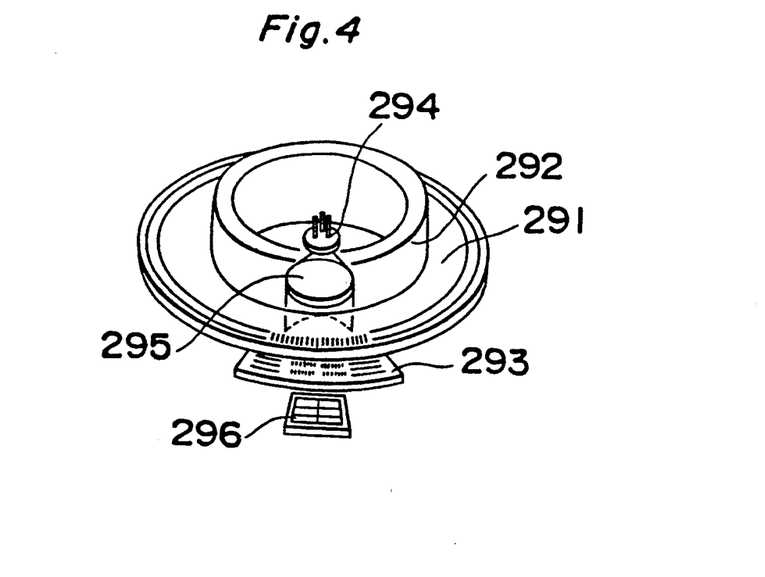
FIG. 4 is a perspective view showing a laser type encoder to be used in the first embodiment.

A magnetic encoder or a normal optical encoder may be used as the rotary encoder, but in the embodiment, a laser type encoder having high resolution and high speed response and utilizing diffraction/interference is used. FIG. 4 shows an example of the laser type encoder. In FIG. 4, reference numeral 291 denotes a moving slit plate having many slits arranged circularly, and the moving slit plate 291 is rotated by a shaft 292 such as the first rotary shaft 202 or the second rotary shaft 203. Reference numeral 293 indicates a fixed slit plate, opposed to the moving slit plate 291. In the fixed slit plate 293, slits are arranged in the configuration of a fan. Light emitted from a laser diode 294 passes through each slit of both slit plates 291 and 293 through a collimator lens 295 and received by a light receiving element 296.

According to the fluid rotating apparatus of the embodiment of the present invention, since the non-contact type synchronous rotation is electronically controlled, it is unnecessary to use a timing gear which is used, for example, in the conventional screw pump. Further, according to the embodiment of the present invention, each rotor is driven by an independent motor such that the apparatus does not require the provision of a power transmitting mechanism for operating gears. In a positive displacement pump or compressor, it is necessary to form a space which changes in its capacity because of a relative motion of two or more rotors. Conventionally, the synchronous rotation of two or more rotors is performed by a transmission gear, a timing gear or a complicated transmission mechanism using a link or a cam mechanism. High speed rotation can be obtained to a certain extent by supplying lubricating oil to the timing gear or the transmission mechanism, but the upper limit of the number of rotations is 10,000 rpm at most in view of vibration, noise, and reliability of the pump or compressor. However, since the embodiment of the present invention does not require such a complicated mechanism as described previously, the rotary portion of the rotor can be rotated at greater than 10,000 rpm and the apparatus can be simplified in its construction because it does not require a mechanism as described above. Since an oil seal is not required, there is no torque loss due to mechanical sliding and it is unnecessary to periodically replace oil seals or oil. Since the power of the vacuum pump is the product of the torque and the number of rotations, a small torque suffices with the increase in the number of rotations. Accordingly, the motor may be reduced in size since less torque is necessary when the rotor rotates at a high speed. Further, since each rotor is driven by an independent motor, the torque necessary for each motor is further reduced. An apparatus of built-in construction in which each motor is incorporated in the rotors as shown in the embodiment can be obtained by these effects, so that the apparatus is compact and lightweight with its space effectively used.

In applying the present invention to the positive displacement vacuum pump, supposing that a spiral groove is provided on the peripheral portion of the rotor, there is one discharge for one rotation in a roots type vacuum pump, so that operating flow-in and flow-out fluid generates a great pulsation while in a screw type vacuum pump, fluid flows approximately continuously. Therefore, the fluctuation of torque is applied to each shaft to a reduced degree. The fluctuation of the torque causes a non-synchronous rotation of the rotary shafts, but rotors can be easily controlled so that they rotate synchronously at high speeds and with high accuracy by adopting the low torque screw type vacuum pump. In the case of the screw type vacuum pump, since in structure, the space between the suction side and the discharge side is closed by a multiple concave-convex engagement, internal leakage is reduced so that the ultimate vacuum can be high. Unlike a gear type rotor or a roots type rotor, the section of a screw type rotor which is perpendicular to the rotary shaft is approximately circular and an internal space can be vacant in the vicinity of the peripheral portion of the rotor, so that the peripheral portion can be utilized as the bearing as described previously. Thus, the apparatus can be reduced in size.

Figure 5A:
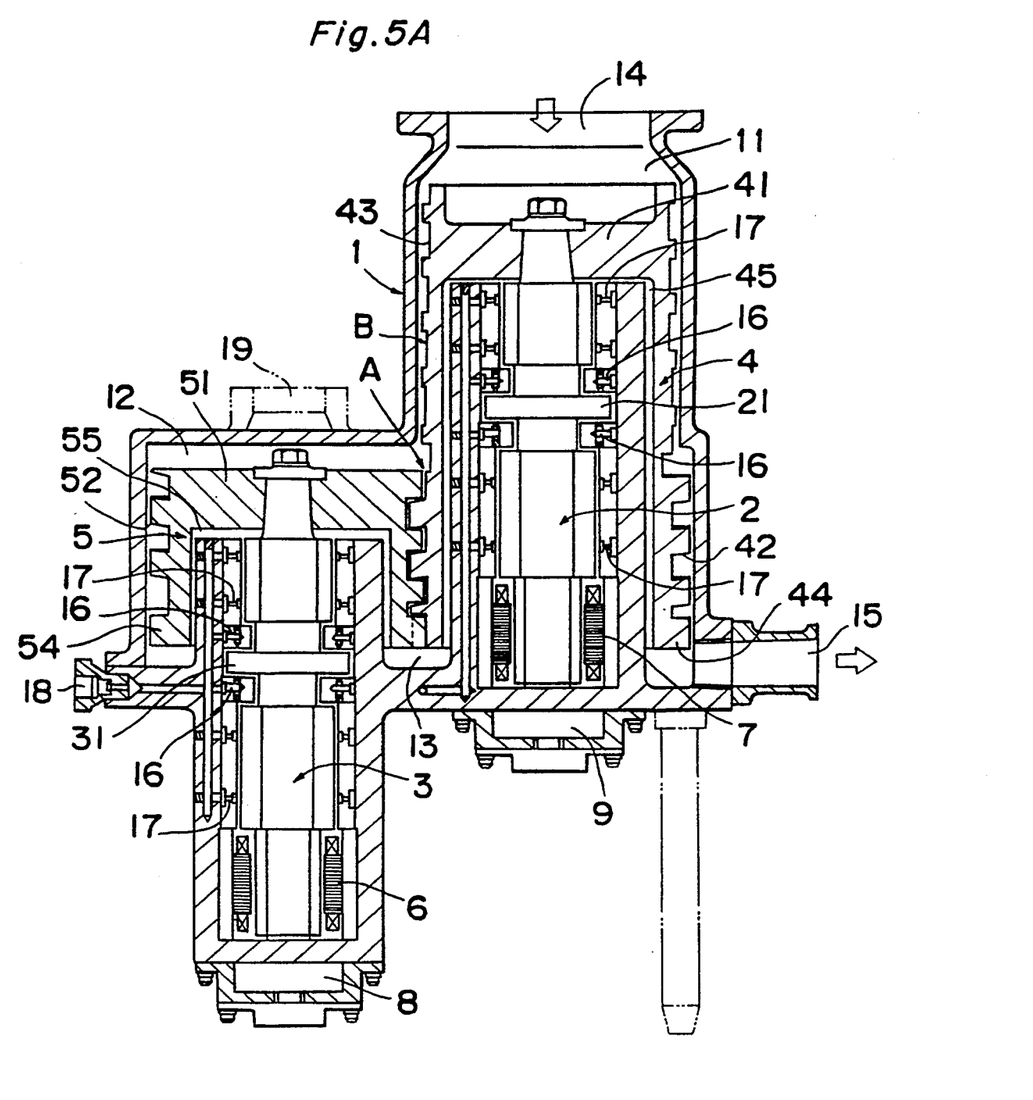
FIG. 5A is a cross sectional view of a vacuum pump for broad-band use according to a second embodiment of the present invention.
Figure 5B:
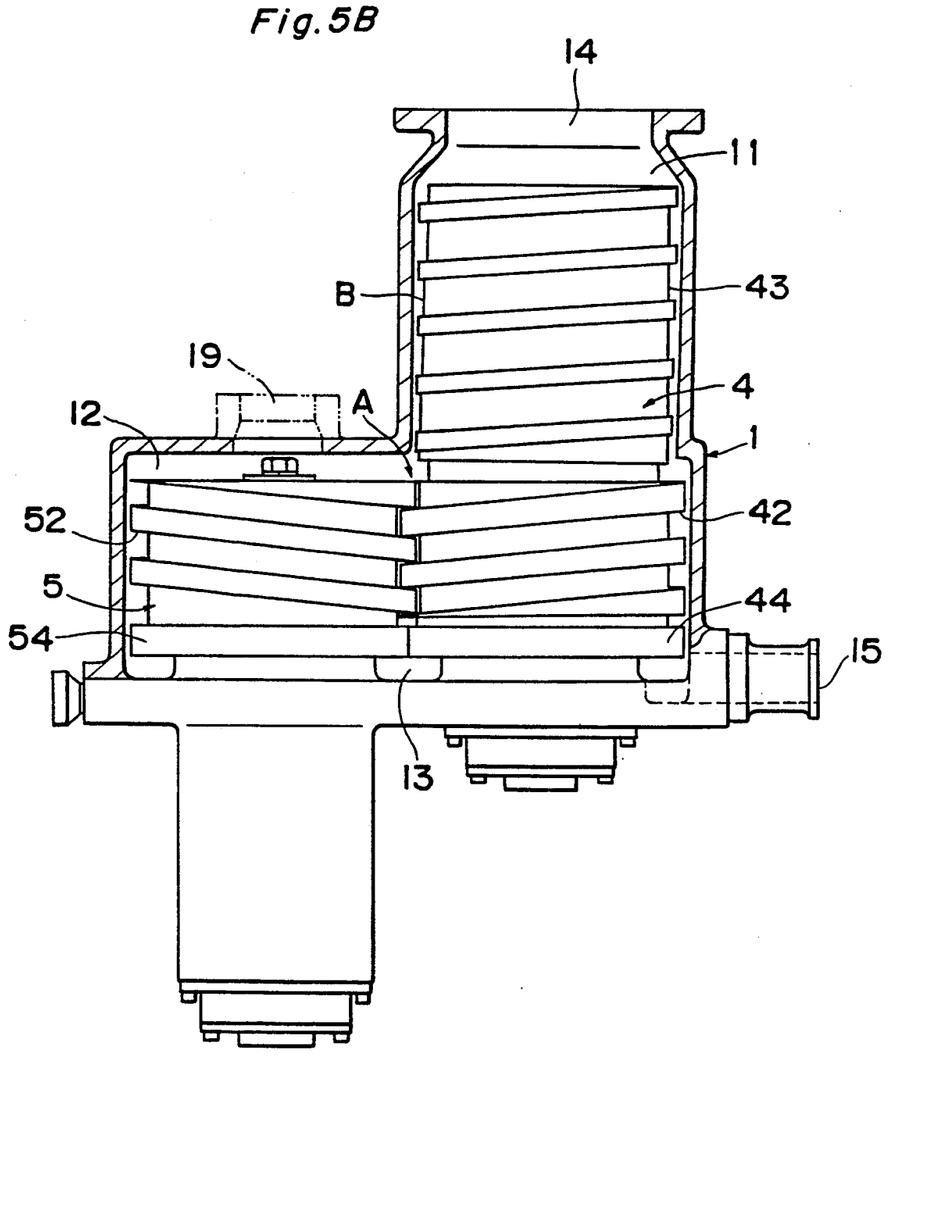
FIG. 5B is a side elevational view of the vacuum pump of FIG. 5A, with a partially cut away housing.

FIGS. 5A and 5B illustrate a vacuum pump for broad-band use according to a second embodiment of the present invention. The vacuum pump is accommodated within a housing 1, the interior of which is divided into a first chamber 11 and a second chamber 12. The lower part of the first chamber 11 communicates with the upper part of the second chamber 12. A first rotary shaft 2 stands vertically within the first chamber 11. A second rotary shaft 3 is housed in the second chamber 12 in parallel to the first rotary shaft 2. Upper ends 41 and 51 of the respective rotary shafts 2 and 3 are closed, where cylindrical rotors 4 and 5 supported in the vicinity of the upper ends 41 and 51 of the shafts 2 and 3 are fitted from outside. First spiral grooves 42 and 52 are provided and are meshed with each other at the outer peripheral surfaces of the rotors 4 and 5 where they confront at a communicating part 13 between the first and second chambers 11 and 12. A closed room defined between the two first spiral grooves 42 and 52 changes its capacity periodically in accordance with the rotation of the rotary shafts 2 and 3, so as to allow a gas to be discharged. More specifically, there is provided a positive displacement vacuum pump structure section A (referred to as first structure section A hereinafter) in the outer peripheries of the rotary shafts 2 and 3 and confronting the communicating part 13. Only a very small clearance is defined between the outer periphery of the rotor 4 of the second rotary shaft 2 spaced from the first structure section A and the cylindrical inner periphery of the first chamber 11. Therefore, when the first rotary shaft 2 is rotated at high speed, the rotary momentum is impressed to the molecules of the gas present in the very small clearance, thereby feeding the molecules to the first structure section A. A kinetic vacuum pump structure section B (referred to as second structure section B hereinafter) is provided in the outer periphery of the rotary shaft 2 spaced from the structure section A. A second spiral groove 43 is formed on the outer peripheral surface of the rotor 4 so as to apply a drag function to the molecules of the gas. That is, in the embodiment, the structure section B is formed in such a manner that the second spiral groove 43 works as a means for applying momentum to the molecules of the gas. This screw groove type drag pump further functions as a viscous pump for feeding gas having a pressure relatively close to atmospheric pressure. Although the first and second rotary shafts 2 and 3 are rotated at high speeds from the start in the vacuum pump of the embodiment of the present invention, the second spiral groove 43 has enough mechanical strength to withstand rotation of the shafts 2 and 3 at high speeds.

Gears 44 and 54 are mounted in the outer peripheral surfaces at the lower ends of the rotors 4 and 5, respectively to prevent contact between the first spiral grooves 42 and 52. These gears 44 and 54 are kept separated from each other when the rotary shafts 2 and 3 are synchronously rotated smoothly, but brought in touch with each other prior to the contact of the first spiral grooves 42 and 52 in the event of a shift of the synchronous rotation. Accordingly, the gears 44 and 54 work to prevent contact and collision between the first spiral grooves 42 and 52.

A suction port 14 is formed at a position, where the first structure section A is arranged, in the first chamber 11, while a discharge port 15 is formed at a position where the second structure section B is defined in the first chamber 11.

Both the first and second rotary shafts 2 and 3 are supported without contact therewith by the compressed gas spouting out from the many orifices 16 and 17 formed within the inner spaces 45 and 55 of the cylindrical rotors 4 and 5, respectively. In other words, the orifices 16 and 17 constitute hydrostatic bearings. The orifices 16 constitute thrust bearings by supplying the compressed gas to disk-shaped parts 21 and 31 of the shafts 2 and 3. On the other hand, the orifices 17 constitute radial bearings by supplying the compressed gas to the outer peripheral surfaces of the shafts 2 and 3. The compressed gas is fed to the orifices 16 and 17 through an introduction port 18.

In general, it is impossible for the kinetic vacuum pump to realize a high degree of vacuum of about $10^{-8}$ through $10^{-10}$ torr at the suction side if $10^{-2}$ through $10^{-4}$ torr or so is not maintained at the discharge side. According to the instant embodiment, a compressed gas is introduced into the housing 1 by means of the hydrostatic bearings and it is feared that the degree of vacuum at the discharge side of the structure section B would be worsened by the introduced compressed gas. However, in the embodiment, since the upper ends 41 and 51 at the side of the suction port 14 of the rotors 4 and 5 constructing the first structure section A are closed, the inner spaces 45 and 55 of the rotors 4 and 5 are able to communicate with the structure section B only through the structure section A. Therefore, the compressed gas supplied into the inner spaces 45 and 55 is shut off at the structure section A and is unable to reach the discharge side of the structure section B. As such, the compressed gas does not obstruct the high vacuum discharging action of the structure section B. The compressed gas is $N_2$ gas in the instant embodiment, and therefore, the pressure in the room where the rotary shafts 2 and 3 and a motor are accommodated is slightly raised, making it possible to prevent invasion of any corrosive gas inside the motor in the case of CVD dry-etching or the like process in which a corrosive gas is used.

The first rotary shaft 2 and the second rotary shaft 3 are rotated by servomotors 7 and 6 at high speed such as several tens of thousands of rpm. The synchronous rotation of the rotary shafts 2 and 3 is detected by rotary encoders 9 and 8 mounted in the housing 1 and controlled by detecting signals of the encoders 8 and 9.

Although it is enough to provide only one suction port 14 at the suction side of the kinetic vacuum pump structure section B according to the embodiment of the present invention, there is formed a second suction port 19 in the second chamber 12 upwardly of the positive displacement vacuum pump structure section A in the instant embodiment. This is to achieve rough discharging at the initial stage directly in the structure section A. The first suction port 14 may be closed during the rough discharging through the suction port 19.

Figure 6A:
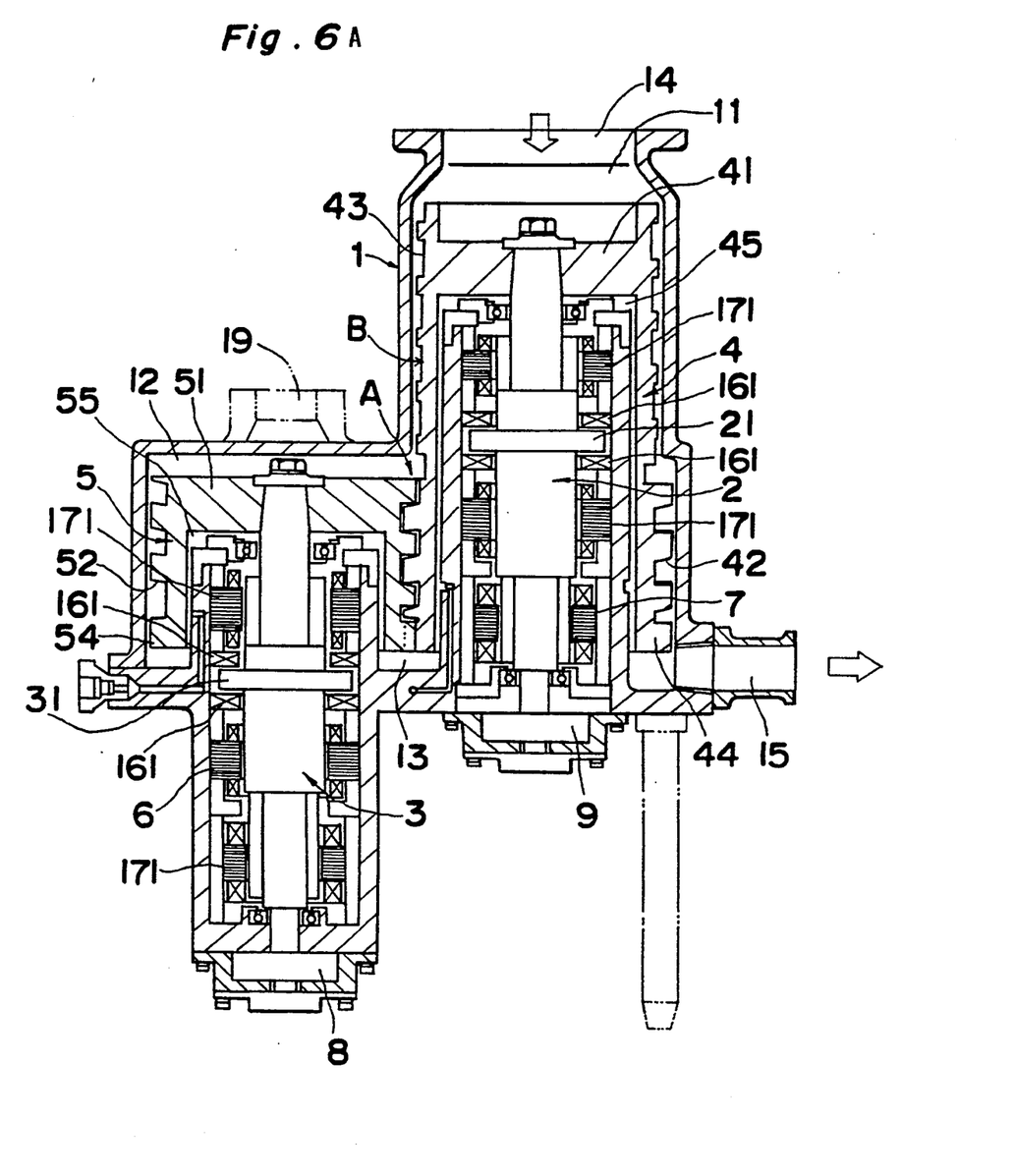
FIG. 6A is a cross sectional view of a vacuum pump for broad-band use according to a third embodiment of the present invention.

FIG. 6A illustrates a vacuum pump for broad-band use according to a third embodiment of the present invention, in which parts designated by the same reference numerals as in FIG. 5 represent equivalent parts. In the third embodiment, the hydrostatic bearing of the second embodiment is replaced by a magnetic bearing, with the other structure being maintained the same. More specifically, magnetic thrust bearings 161 are arranged facing the disk-shaped parts 21 and 31 of the rotary shafts 2 and 3 and magnetic radial bearings 171 are mounted to confront the outer peripheral surfaces 2 and 3 of the shafts 2 and 3.

Figure 6B:
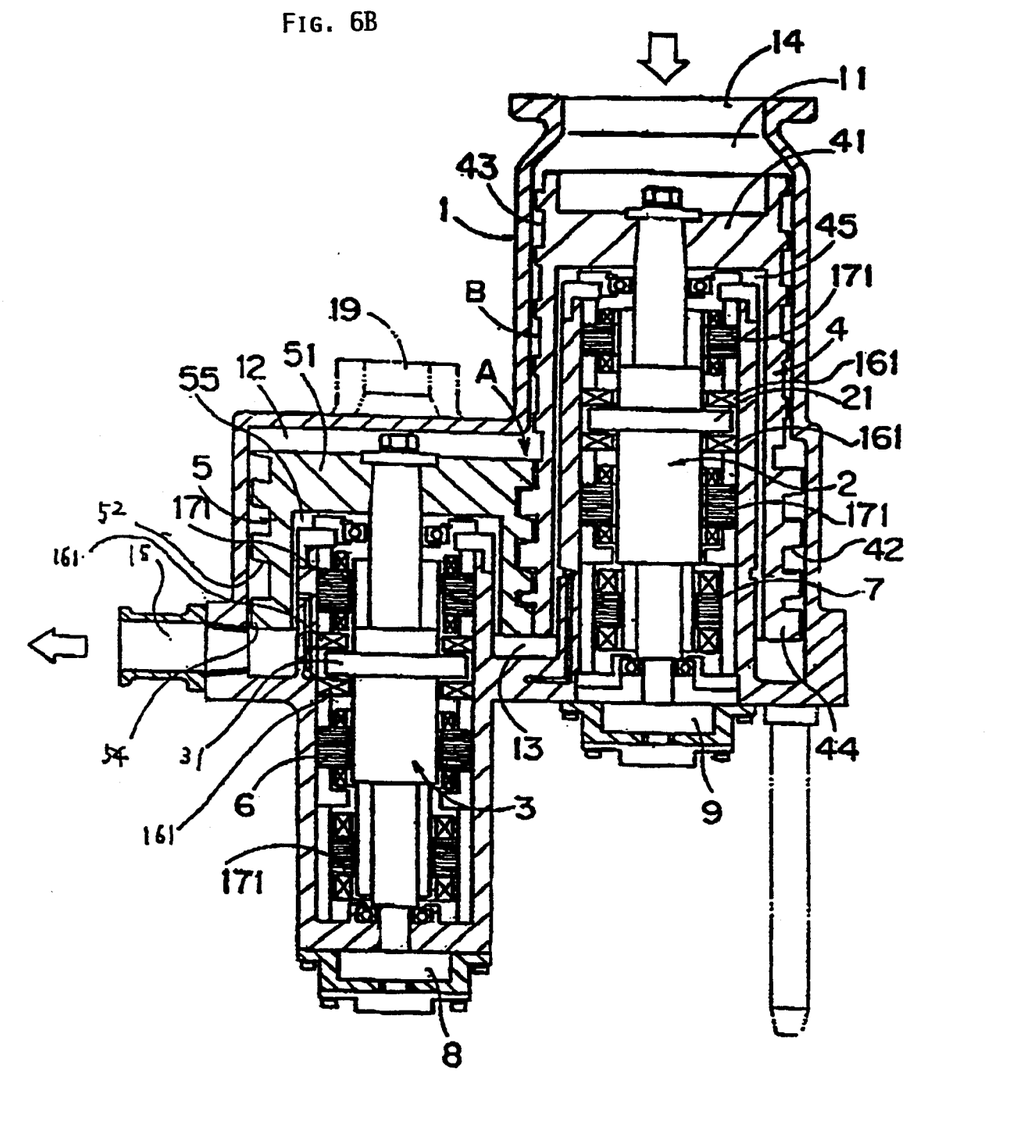
FIG. 6B is a cross sectional view of a vacuum pump for broad-band use according to an alternative arrangement of the third embodiment of the present invention.

FIG. 6B illustrates a vacuum pump for broad-band use according to an alternative arrangement of the third embodiment of the present invention. The FIG. 6B arrangement is identical to that of FIG. 6A except that, in FIG. 6B, the discharge port 15 is positioned at a lower end of the second chamber 12 rather than the first chamber 11. Thus, the discharge passage can be located at the downstream side of the pump at either the lower end of the first chamber 11 (see FIG. 6A) or the lower end of the second chamber 12 (see FIG. 6B). Furthermore, although these alternative arrangements for the discharge port are shown in the drawing figures with respect to only the third embodiment, it should be noted that similar alternative arrangements can be applied to other embodiments of the invention including the second embodiment shown in FIGS. 5A and 5B and described above, and the fourth embodiment shown in FIGS. 7A and 7B and described below.

Since the first and second spiral grooves as employed in the second and third embodiments can only realize a degree of vacuum of approximately $10^{-8}$ torr, turbine blades are necessary to apply momentum to the molecules of gas to attain an extremely high vacuum degree like $10^{-10}$ torr. In the vacuum pump of the embodiment of the present invention, a high speed rotation is started at the discharge side of the structure section B under atmospheric pressure or pressure close to atmospheric pressure since the discharge port is opened to the air, and the turbine blades may be broken by the dynamic lift impressed thereto during rotation. Therefore, the turbine blades cannot be employed as it is.

Figure 7A:
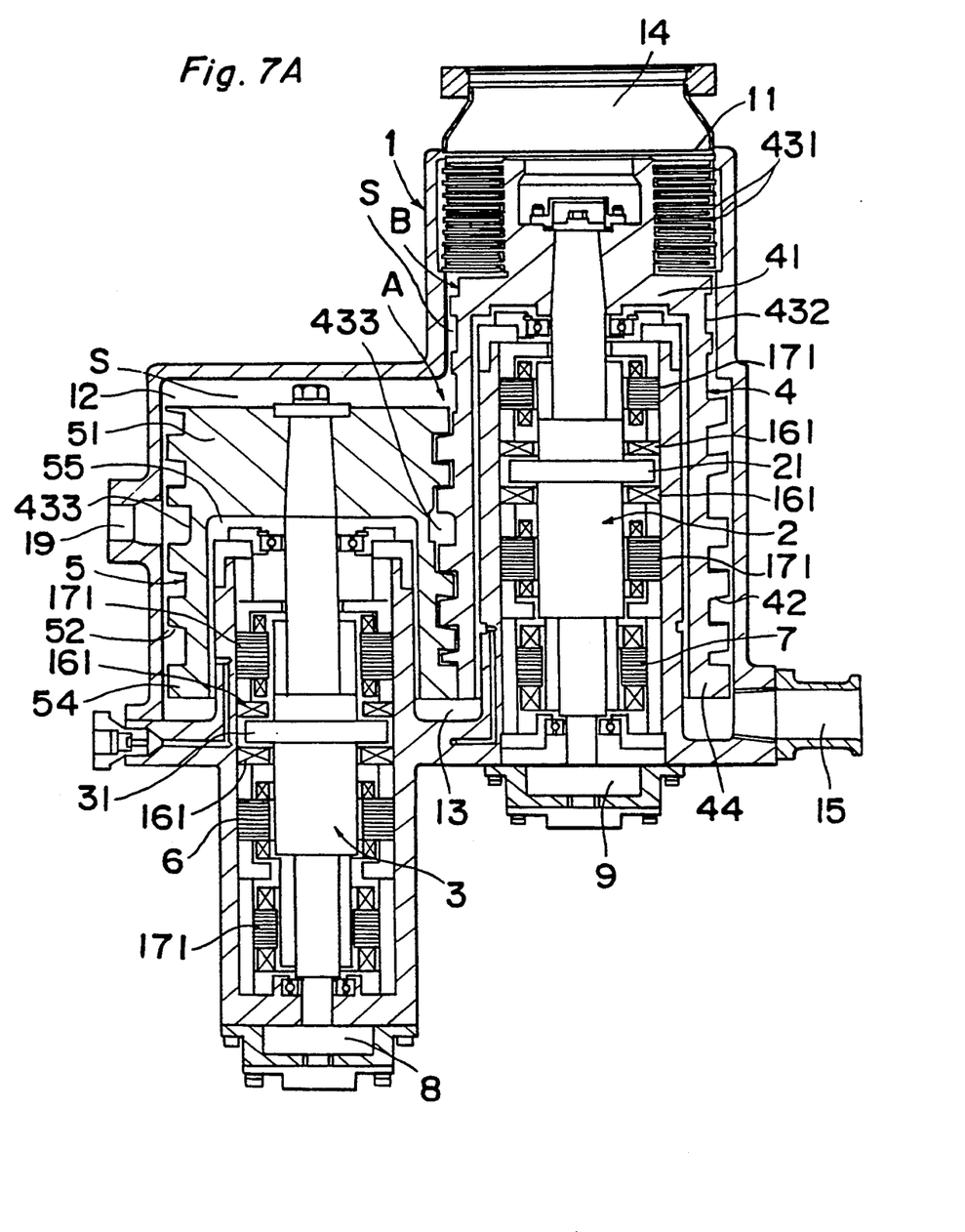
FIG. 7A is a cross sectional view of a vacuum pump for broad-band use according to a fourth embodiment of the present invention.
Figure 7B:
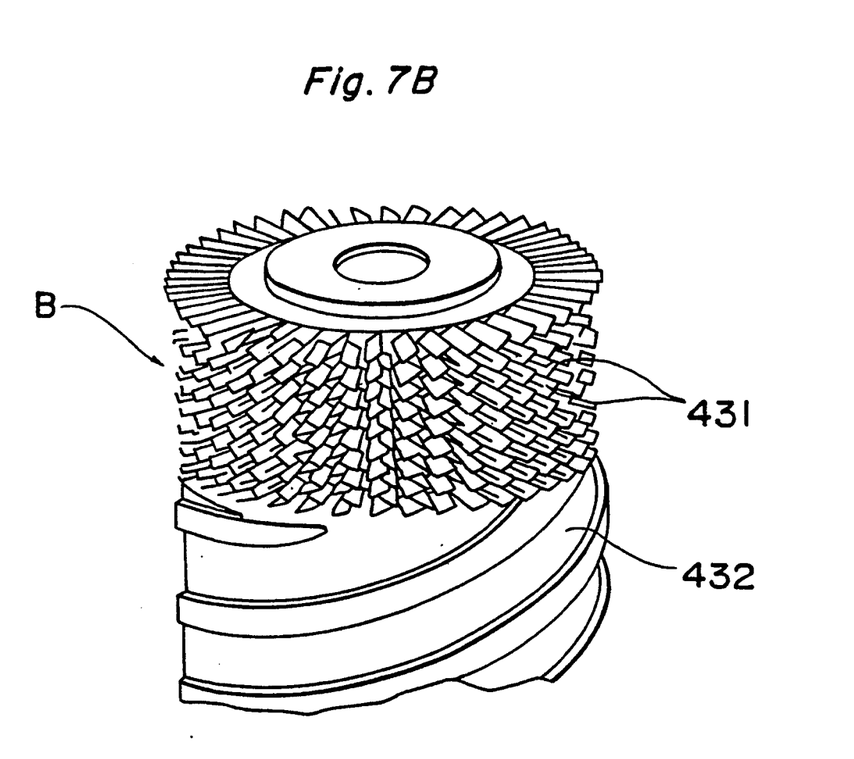
FIG. 7B is a perspective view partly showing a turbine blade and a spiral groove of the vacuum pump of FIG. 7A.

In a vacuum pump for broad-band use of a fourth embodiment of the present invention shown in FIGS. 7A and 7B, the turbine blades are employed without the problems described above.

Referring to FIG. 7, parts denoted by the same reference numerals as in FIG. 5 represent the same parts. The fourth embodiment is different from the second embodiment in the following points. Namely, first, turbine blades 431 constitute a part of a means for applying momentum to the molecules of gas in the structure section B and a second spiral groove 432 constitutes the remaining part of the means. The second suction port 19 is formed at the lateral side of the structure section A in the second chamber 12. According to the fourth embodiment as shown in FIG. 7A, a groove 433 is horizontally formed at a part of the structure section A which confronts the second suction port 19, and is a path for reducing the inlet path resistance. This groove 433 is not always necessary. Further, the magnetic bearings 161 and 171 may be changed to hydrostatic bearings. Moreover, means for applying momentum to the molecules of gas in the structure section B may be constituted by the turbine blades 431 alone.

In the above-described construction, while the first suction port 14 is closed and the second suction port 19 is opened, when the first and second rotary shafts 2 and 3 first start rotating at low speeds such as approximately 1,800 through 7,600 rpm, the discharge side of the structure section B is rendered below atmospheric pressure immediately after the start of the rotation. However, a space S positioned upwardly of the second suction port 19 of the first and second chambers 11 and 12 has a considerably small capacity and moreover it is closed, and therefore the gas inside the space S is promptly discharged by the discharging action of the structure section A. Eventually, the discharge side of the structure section B reaches a degree of vacuum of about $10^{-2}$ through $10^{-3}$ torr immediately after the start of rotation of the rotary shafts 2 and 3, such that the turbine blades 431 of the structure section B do not become broken even though rotated at high speeds such as several tens of thousands of rpm. After the suction side of the structure section B in the chamber reaches approximately $10^{-2}$ through $10^{-3}$ torr, the second suction port 19 is closed and the first suction port 14 is opened.

The vacuum pump for broad-band use of the present invention is not limited to the foregoing embodiments alone.

As described hereinabove, the embodiments of the present vacuum pump are provided with the kinetic vacuum pump structure section and the positive displacement vacuum pump structure section in one housing, thereby allowing the single vacuum pump to realize a high degree of vacuum, all at once, from the rough discharging stage. As a result, the equipment is compact in size, adaptable to complex processes (in multi-chambers), simplified in structure and reduced in cost.

According to the embodiments of the present invention, although it takes a time for roughing when the gas is discharged through a narrow slit in the kinetic vacuum pump structure section, the time can be shortened since the second suction port is formed at a part located higher than the positive displacement vacuum pump structure section in the first chamber to roughly discharge the gas directly therethrough.

Moreover, since the second suction port is arranged at the lateral side of the positive displacement vacuum pump structure section in the embodiment of the present invention, turbine blades can be employed to apply momentum to the molecules of gas in the kinetic vacuum pump structure section. Consequently, an extreme degree of vacuum, i.e. $10^{-10}$ or so can be easily attained.

If the first and second rotary shafts are synchronously rotated through mechanical contact with gears or the like, abrasion of the contacting parts may endanger correct synchronous rotation of the shafts and also the lubricant oil used in the gears may decrease the cleanliness. However, according to the embodiment of the present invention, a rotary position detecting sensor is provided with at least one of the first and second rotary shafts, to thereby control the synchronous rotation of the shafts by use of a detecting signal of the sensor. Therefore, mechanical contact of the synchronous rotation transfer part is unnecessary and environmental pollution can be prevented.

Since the first and second rotary shafts are supported by non-contact type bearings, mechanical abrasion of the bearings can be avoided and lubricant oil is not necessary. Moreover, costs can be limited if hydrostatic bearings are used.

Figure 8:
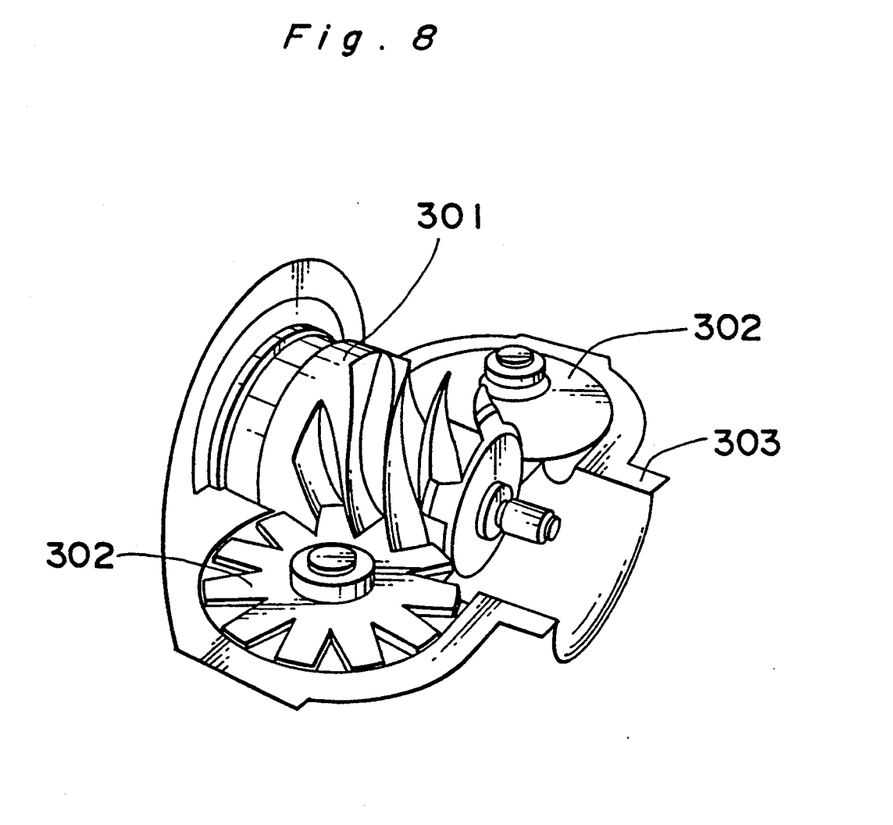
FIG. 8 is a perspective view of a modification of the present invention.

Furthermore, the present invention is not limited to the embodiments in which the first rotary shaft is parallel to the second rotary shaft. As shown in FIG. 8, a first rotary shaft 301 having a kinetic vacuum pump structure section A and a positive displacement vacuum pump structure section B may intersect two second rotary shafts 302 having a positive displacement vacuum pump structure section B in a casing 303 while the first and second rotary shafts 301 and 302 engage with each other at the positive displacement vacuum pump structure sections B so as to perform the above-described operations.

Figure 9:
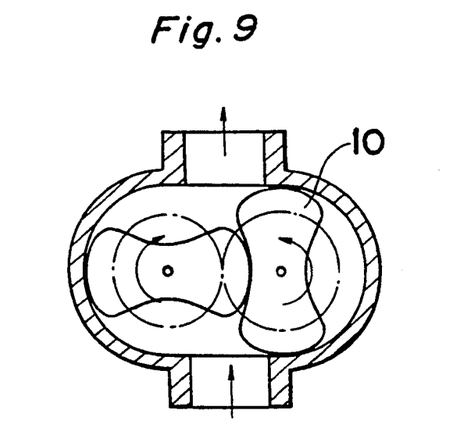
Figure 10:
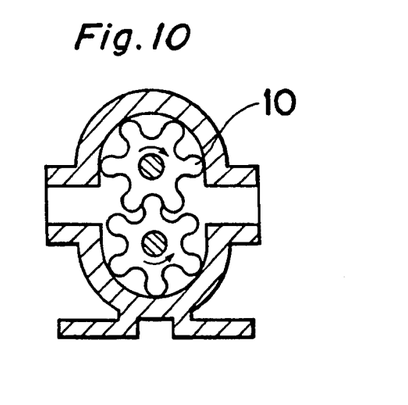
Figure 11A:
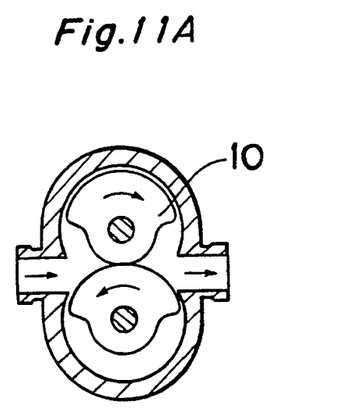
Figure 11B:
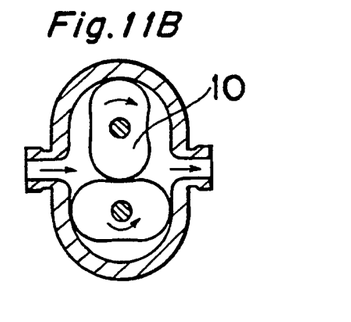
Figure 12:
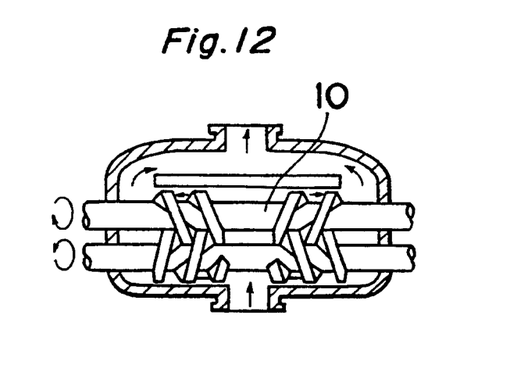
Figure 13:
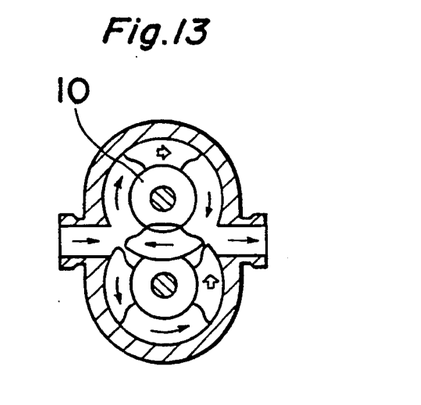

The fluid rotating apparatus according to the present invention may be used as an air conditioning compressor, and the rotor 10 of the rotary portion thereof may be of the root type as shown in FIG. 9, the gear type as shown in FIG. 10, single lobe or double lobe type as shown in FIGS. 11A and 11B, respectively, screw type as shown in FIG. 12, or outer circumferential piston type as shown in FIG. 13.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed

1. A vacuum pump for broad-band use, comprising:
    a housing having a first chamber and a second chamber communicating with the first chamber;
    a first rotary shaft rotatably accommodated in the first chamber;
    a second rotary shaft rotatably accommodated in the second chamber, the first and second rotary shafts being synchronously rotated;

positive displacement vacuum pump structure sections formed at outer peripheries of the first and second rotary shafts where the first chamber communicates with the second chamber;

a kinetic vacuum pump structure section formed at an outer periphery of the first rotary shaft and spaced from the positive displacement vacuum pump structure sections;

a first suction port formed at a part of the first chamber where the kinetic vacuum pump structure section of the first rotary shaft is formed; and a discharge port formed at a part of one of the first and second chambers where the positive displacement vacuum pump structure section is formed.

2. A vacuum pump for broad-band use as claimed in claim 1, further comprising a second suction port formed at a part of the second chamber located upwardly of the positive displacement vacuum pump structure section of the second rotary shaft.

3. A vacuum pump for broad-band use as claimed in claim 1, further comprising a rotary position detecting sensor arranged at one of the first and second rotary shafts, and means for controlling the first and second rotary shafts to be synchronously rotated on the basis of a detecting signal from the sensor.

4. A vacuum pump for broad-band use as claimed in claim 1, further comprising bearings, arranged in the housing, for supporting the first and second rotary shafts without contact therewith.

5. A vacuum pump for broad-band use as claimed in claim 4, wherein the non-contact type bearings are hydrostatic bearings.

6. A vacuum pump for broad-band use as claimed in claim 1, further comprising contact preventing gears, arranged at the first and second rotary shafts, for preventing the first and second rotary shafts from contacting with each other.

7. A vacuum pump for broad-band use as claimed in claim 1, further comprising a second suction port formed at a lateral side of the positive displacement vacuum pump structure section, wherein a turbine blade is provided at least at the kinetic vacuum pump structure section and defines a means for applying momentum to molecules of gas.

8. A vacuum pump for broad-band use as claimed in claim 1, further comprising a rotary position detecting sensor arranged at one of the first and second rotary shafts, and means for controlling the first and second rotary shafts to be synchronously rotated on the basis of a detecting signal from the sensor.

9. A vacuum pump for broad-band use as claimed in claim 1, further comprising contact preventing gears, arranged at the first and second rotary shafts, for preventing the first and second rotary shafts from contacting with each other.

10. A vacuum pump for broad-band use as claimed in claim 1, further comprising motors for driving said first and second rotary shafts, respectively.

* * * * *